Nov. 28, 1961  A. L. SANNIPOLI ET AL  3,010,867
MANUFACTURE OF PAINT ROLLERS
Original Filed Oct. 20, 1955  7 Sheets-Sheet 1

INVENTORS
ALFRED L. SANNIPOLI
& EARL E THOMAS
BY
Barnes, Kisselle, Raisch & Choate
ATTORNEYS.

Nov. 28, 1961     A. L. SANNIPOLI ET AL     3,010,867
MANUFACTURE OF PAINT ROLLERS
Original Filed Oct. 20, 1955     7 Sheets-Sheet 4

INVENTORS
ALFRED L. SANNIPOLI
& EARL E. THOMAS
BY
ATTORNEYS

Nov. 28, 1961     A. L. SANNIPOLI ET AL     3,010,867
MANUFACTURE OF PAINT ROLLERS Original Filed Oct. 20, 1955     7 Sheets-Sheet 5

INVENTORS
ALFRED L. SANNIPOLI
& EARL E. THOMAS
BY
Barnes, Kisselle, Raisch & Choate
ATTORNEYS.

United States Patent Office 3,010,867
Patented Nov. 28, 1961

3,010,867
MANUFACTURE OF PAINT ROLLERS
Alfred L. Sannipoli, Royal Oak, and Earl E. Thomas, Detroit, Mich., assignors to Seamless Covers, Incorporated, Fond du Lac, Wis., a corporation of Wisconsin
Original application Oct. 20, 1955, Ser. No. 541,702, now Patent No. 2,944,588, dated July 12, 1960. Divided and this application June 30, 1958, Ser. No. 745,632
29 Claims. (Cl. 156—367)

This invention relates to the manufacture of paint rollers and particularly to an apparatus for inverting and mounting the sleeves of knitted pile fabric onto hollow cores to form the paint rollers.

A common method used in the manufacture of paint rollers is to helically wind a strip of knitted pile fabric onto a hollow core which has been previously coated with adhesive. Such a procedure is not only costly and time-consuming but, in addition, may result in a non-uniform coverage of the core inasmuch as spaces may occur between the windings of the strip of knitted pile fabric. In addition, paint rollers made in this manner may cause uneven application of paint. It has been more recently suggested that a seamless tubular sleeve be used which has substantially the same diameter as the core. Such a roller is shown, for example, in the patent to Schmidt, 2,704,877, dated March 29, 1955, titled "Process and Machine for Treating and Shearing Fabric Sleeves Having a Nap." The seamless knitted tubular sleeves may be made on machines such as that shown in the patent to Moore, 1,849,466, issued March 15, 1932. The pile is formed by knitting fibers into the stitches of the base fabric as the fabric is being knitted. Sleeves knitted on such machines are formed with the nap or pile on the interior of the sleeve. The sleeves must therefore be inverted and mounted onto cores to provide paint rollers. In the handling of such sleeves numerous problems are presented because of the tendency of the knitted sleeves to grip the core when it is attempted to slide the sleeve over the core.

The base fabric of the pile sleeve is relatively elastic, and in the size under consideration, the fibers of the pile are quite long and intermingled so that substantially the entire interior of the sleeve prior to inverting is filled with pile fibers. Accordingly, it is difficult, if not impossible, to insert any tools or devices into the sleeve to facilitate inverting the sleeve without damaging the sleeve. After the sleeve is inverted, it must be mounted on a core and, unless the fibers are sealed to the base fabric, they may be easily pulled out of the base fabric. The sleeve under consideration may be approximately two inches in diameter and of any length, for example, forty-eight inches.

It is therefore an object of this invention to provide an apparatus for inverting the knitted sleeves and mounting the inverted sleeves on cores.

It is a further object of the invention to provide apparatus which is semi-automatic in operation and requires a minimum of supervision by an operator.

It is a further object of the invention to provide an apparatus for mounting inverted sleeves on cores wherein the sleeve is not only adhered to the core but, in addition, the pile fibers are embedded in the base fabric.

Basically, the apparatus comprises an inverting machine and a transferring and mounting machine. The inverting machine comprises a hollow mandrel onto which a transfer tube is mounted and through which the knitted sleeve is initially passed. The means for successively pulling the sleeve onto the transfer tube comprises a pair of jaws which are reciprocated to alternately grip successive portions of the sleeve and move them along the tube. The passing of the sleeve through the hollow mandrel and the gripping and reciprocating movement of the jaws are controlled by automatic means. The apparatus for transferring the sleeve from the transfer tube to the paint roller core comprises means for successively feeding the cores through a second hollow mandrel onto which the tube with the inverted sleeve is mounted. The apparatus also includes means for feeding paint roller cores in succession through the second hollow mandrel. Means are provided for gripping the sleeve and core to strip the sleeve from the transfer tube onto the paint roller core. This means includes a pair of jaws. In addition, means are provided for insuring that the end of the sleeve is positively transferred from the tube to the core. The apparatus also includes means for automatically applying adhesive to the cores. The entire cycle of the transferring and mounting apparatus is controlled by the movement of the cores in succession. The adhesive which is applied to the core prior to the mounting of the pile fabric sleeve on the core not only serves to adhere the sleeve to the core but, in addition, locks the pile fibers in the base fabric and prevents them from being pulled out of the sleeve.

Figure 1:
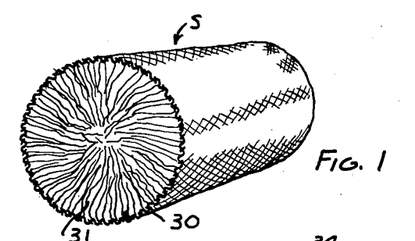
FIG. 1 is a perspective view of the knitted sleeve prior to inverting.

Referring to FIG. 1, the sleeve S has been knitted on a knitting machine as heretofore set forth and comprises a base fabric 30 and a pile 31. The base fabric 30 and the pile 31 may be made of natural or synthetic fibers such as wool, cotton, mohair, rayon, nylon, dynel and the like, or mixtures thereof. As knitted, the pile fabric extends inwardly from the base fabric of the sleeve and is of such a length that it substantially fills the interior of the sleeve. The pile fibers are intermingled and invariably some of the fibers are unconnected to the base fabric. The entire sleeve is relatively limp and flexible and the base fabric has a substantial elasticity longitudinally and transversely. The pile fibers are mechanically held in the base fabric by the stitches of the knitted base fabric and may be pulled out of the base fabric unless they are locked into the stitches by a subsequent operation as presently described.

Figure 2:
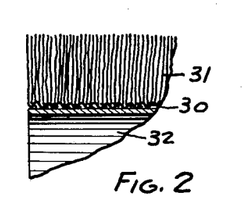
FIG. 2 is a fragmentary sectional view of the sleeve as mounted on a core.

As shown in FIG. 2 after the sleeve S has been inverted, it is mounted on a paint roller core 32 of rigid or semi-flexible material such as plastic, paper, metal or cloth. A layer of adhesive is provided between the base fabric 30 and the core 32. The pile fabric may then be combed and sheared providing a uniform pile, which makes the roller satisfactory for use in the application of paint.

Figure 3:
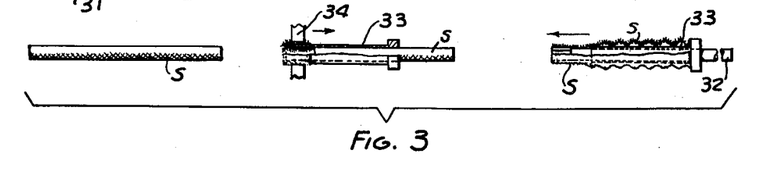
FIG. 3 is a diagrammatic view showing the inverting of the sleeve and transferring of the sleeve onto the core.

The basic operations required for inverting and transferring the sleeve are shown diagrammatically in FIG. 3. As shown in FIG. 3, the sleeve S is positioned within a hollow transfer tube 33 which is mounted so that the interior surface thereof is unobstructed to receive the sleeve S. The end of the sleeve S is turned over the end of the transfer tube 33 onto the outer surface thereof and the turned-over end of the sleeve is then pulled to thus invert the sleeve from the interior of the transfer tube 33 onto the outer surface of the transfer tube 33. In order to invert the sleeve, a pair of reciprocable jaws 34 are caused to grip and slide successive portions of the sleeve from the interior onto the outer surface of the transfer tube 33 in the direction of the arrow. The transfer tube 33, with the inverted sleeve thereon, is then positioned in the path of the core 32 and the core 32 caused to move relative to the tube 33 and through the tube 33. As the core 32 passes through the tube 33, a portion of the inverted sleeve S is pulled off the tube 33 onto the core 32, and thereafter the core 32 and the sleeve S are caused to move relative to the tube 33 to transfer the sleeve S from the tube 33 to the core 32. The core 32 is preferably coated with an adhesive on the outer surface thereof prior to its passage through the tube 33.

The knitted sleeve S, when in an untensioned condition, has a diameter less than the outer diameter of the tube 33 or the core 32 on which it is to be mounted. The tube 33 has an outer diameter greater than the outer diameter of the core 32. Thus, the sleeve S is tensioned or expanded when it is inverted onto the tube 33, and thereafter caused to contract when it is pulled from the tube 33 onto the core 32.

Because of the inherent tendency of a knitted sleeve to grip a member positioned within the sleeve, it is preferable to gather the sleeve S onto the tube 33 as it is inverted so that the gathered length thereof is substantially less than the original length. For example, the sleeve S may be approximately forty-eight inches in length prior to inverting and may be inverted and gathered onto a tube 33 of approximately eighteen inches in length. The inverted sleeve of this dimension in the gathered condition can then be slid onto a core of about forty-eight inches in length with much less difficulty than would be the case if the sleeve were not in a gathered condition.

Figure 4:
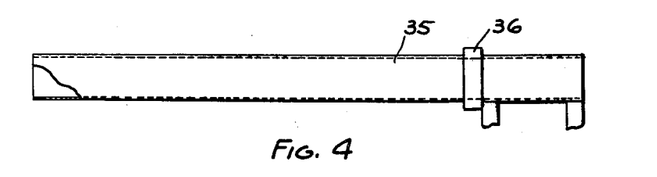
FIG. 4 is a part sectional elevational view of the mandrel which is used in inverting the sleeve.
Figures 5, 6:
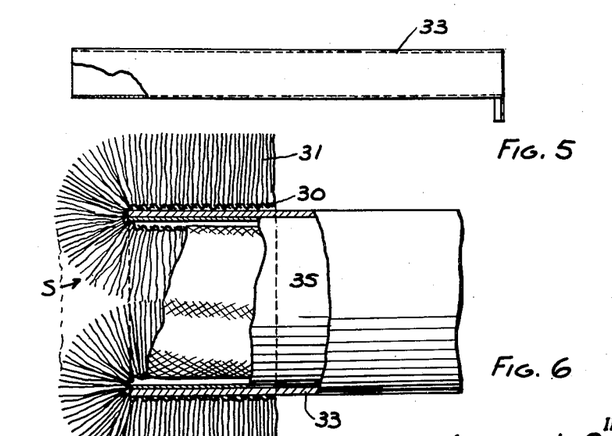
FIG. 5 is a part sectional elevational view of the tube which is used in inverting the sleeve.
FIG. 6 is a fragmentary part sectional view of the apparatus for inverting the sleeve, showing the position of the sleeve at the beginning of the inverting operation.

As shown in FIGS. 4 and 5, the transfer tube 33 onto which the sleeve S is inverted is designed so that it can be removably mounted on the inverting apparatus and also on the transferring apparatus in such a manner that it is rigid and, in addition, the interior thereof is generally unobstructed. In order to accomplish this, a hollow mandrel 35 is provided which has approximately the same outer diameter as the inner diameter of the tube 33. The tube 33 is slipped over the mandrel 35 and held in position by a stop 36. The interrelationship of the sleeve S, tube 33 and hollow mandrel 35 during the inverting is shown in FIG. 6. The sleeve S fits loosely within the hollow mandrel 35 and the end thereof has been turned over and onto the tube 33. The pile 31 of the sleeve S fills substantially the entire interior of the sleeve.

Figures 7, 8, 9:
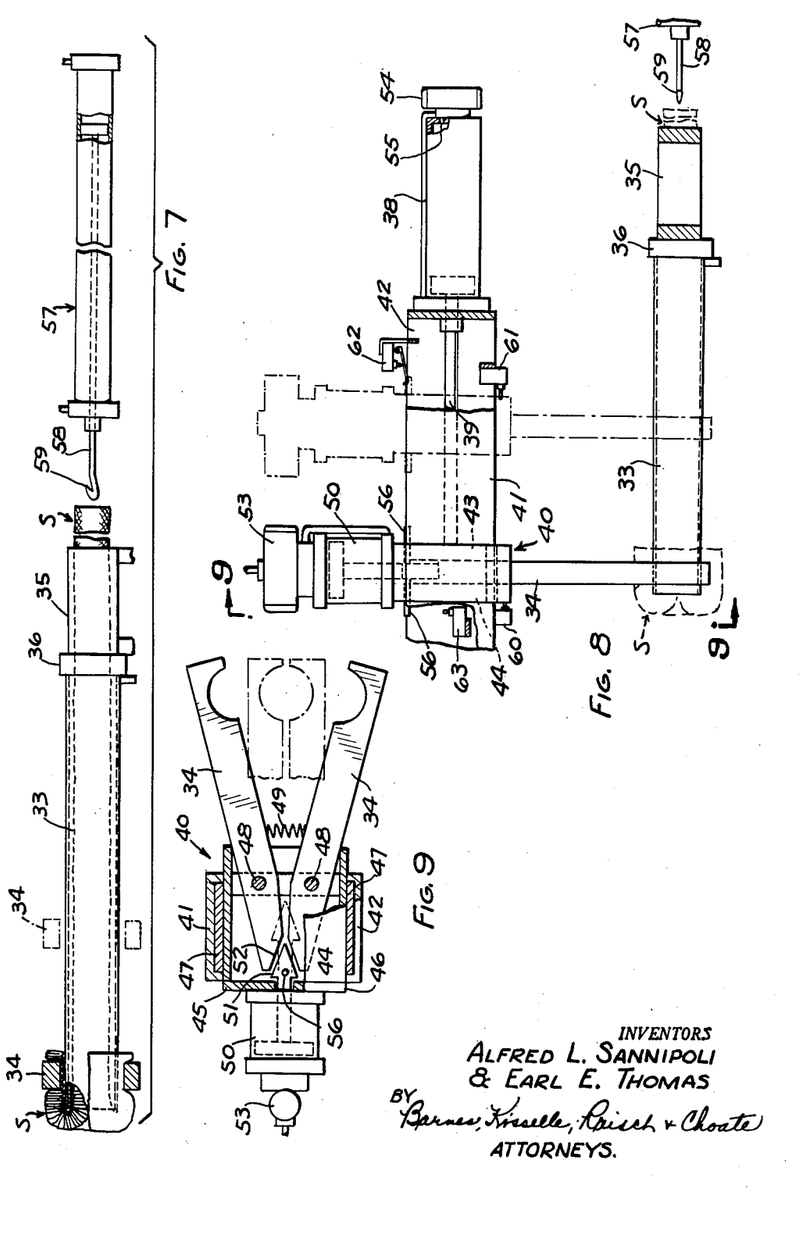
FIG. 7 is a part sectional elevational view of the apparatus for inverting the sleeve.
FIG. 8 is a part sectional plan view of the apparatus shown in FIG. 7.
FIG. 9 is a sectional view taken along the lines 9—9 in FIG. 8.

As shown in FIG. 7, means is provided for positioning the sleeve within the hollow mandrel. This includes a pneumatic cylinder motor 57 positioned at one end of the hollow mandrel 35 with the piston rod 58 thereof extending coaxially of the mandrel 35. The end of the piston rod 58 is provided with a hook 59, whereby when the cylinder is actuated, the rod 58 moves through the mandrel 35 bringing the hook into position adjacent the opposite end of the mandrel. The end of the sleeve S is then attached to the rod by means of the hook 59, and when the cylinder is actuated to retract the rod, the sleeve is pulled through the mandrel 35 into proper position within the mandrel for inverting. The end of the sleeve S is then manually turned or pulled over the edge of the tube 33 onto the outer surface of the tube 33 (FIG. 6). In order to invert the sleeve onto the tube 33 and simultaneously gather the sleeve to provide a shorter effective length, there is provided in conjunction with the mandrel 35 a pair of jaws 34 which are mounted for reciprocating movement in a path parallel to the axis of the mandrel 35.

As shown in FIG. 9, the jaws are mounted at one end within a housing 40 which slides within upper and lower chanels 41 and 42, respectively. Channels 41, 42 extend along one side of mandrel 35 in parallel spaced relation thereto. The housing 40 includes side plates 43, 44 which form the side walls thereof and upper and lower plates 45, 46 which form the top and bottom walls thereof. In addition, bearing blocks 47 are mounted on the plates 45 and 46 and are adapted to ride on the channels 41, 42 to guide the housing 40 in its movement along the channels. The jaws 34 are pivotally mounted in the side walls 43, 44 by pins 48. A spring 49 extends between the jaws and tends to maintain them in separated position. The opening and closing of the jaws is controlled by a pneumatic motor 50 positioned on the one end of the housing and having a bevelled end 51 on the piston rod thereof which when actuated engages bevelled ends 52 of the jaws 34 with a camming action and causes the jaws to close into gripping relationship around the tube 33 as shown in dotted lines in FIG. 9.

The operation of the motor 50 in controlled by a solenoid actuated valve 53 which is of the well-known type including two solenoids. The construction of the valve is such that a momentary electrical impulse will cause the valve to be actuated. Momentary energization of one solenoid will move the piston rod in one direction and momentary energization of the other solenoid will move the piston rod in the opposite direction. The movement of the housing 40 in guide channels 41, 42 along a path parallel to the axis of the mandrel 35 is provided by a pneumatic cylinder 38 mounted at one end of the channels 41, 42 and having the piston rod 39 thereof connected to the housing 40. The operation of the pneumatic cylinder 38 is controlled by a valve 54 similar to the valve 53. Air is supplied to the ends of the cylinders through suitable openings, for example, as shown at 55 in FIG. 8.

After the sleeve S has been placed in position within the hollow mandrel 35 and the end thereof has been turned over onto the transfer tube 33, the inverting mechanism is actuated causing the jaws 34 to grip the sleeve, as shown in FIG. 8, and the jaws are moved to the dotted line position shown in FIG. 8. By this movement, a portion of the sleeve S is inverted onto the transfer tube 33. The grip of the jaws 34 is then released, and the jaws are returned to the initial position wherein they are again caused to close and grip the sleeve and thereafter move to the dotted line position causing more of the sleeve to be inverted onto the tube 33. The successive opening and closing of the jaws and movement thereof axially of mandrel 35 is continued until the entire length of the sleeve has been inverted onto the tube 33. Each time the sleeve is gripped and moved by the jaws, an additional portion of the sleeve is pulled over onto the tube 33 and the portions of the sleeve previously inverted are pushed along the length of the tube causing them to gather.

As previously set forth, the length of the tube 33 is preferably less than the length of the sleeve S prior to inverting whereby the sleeve is gathered, as shown by broken lines in FIG. 8, onto the tube 33. For example, the initial length of the sleeve S may be forty-eight inches while the length of the tube 33 is eighteen inches. The inverting operation could be accomplished, for example, in six successive eight-inch movements of the jaws.

In the apparatus shown, the entire movement of the jaws is automatic and is controlled by microswitches 60, 63 positioned at one end of the path of movement of jaws 34 and microswitches 61, 62 positioned at the other end of the path of movement of the jaws. At the beginning of the inverting cycle, a main switch (not shown) is closed which actuates the valve 53 causing the motor 50 to close the jaws 34 around the sleeve. The closing of the jaws causes a rod 56, mounted at the bevelled end 51 of the piston rod of motor 50, to contact the switch 63. This switch actuates valve 54 causing the cylinder 38 to move the jaw housing 40 along the length of the channels 41, 42. As the rod 39 which moves the housing 40 nears the end of its stroke, the housing 40 contacts switch 61 which actuates valve 53 to cause the jaws to open by actuating the cylinder 50. The opening of the jaws causes the rod 56 to contact switch 62 which actuates the valve 54 to cause the cylinder 38 to return the jaw housing 40 to its original position. As the jaw housing 40 returns to its original position, the housing contacts switch 60 which actuates valve 53 to again close the jaws. The cycle is then repeated by the operation of the switches until terminated by a timer which, in the case of the forty-eight inch length sleeve, stops the operation of the jaws after six successive movements.

Figure 10:
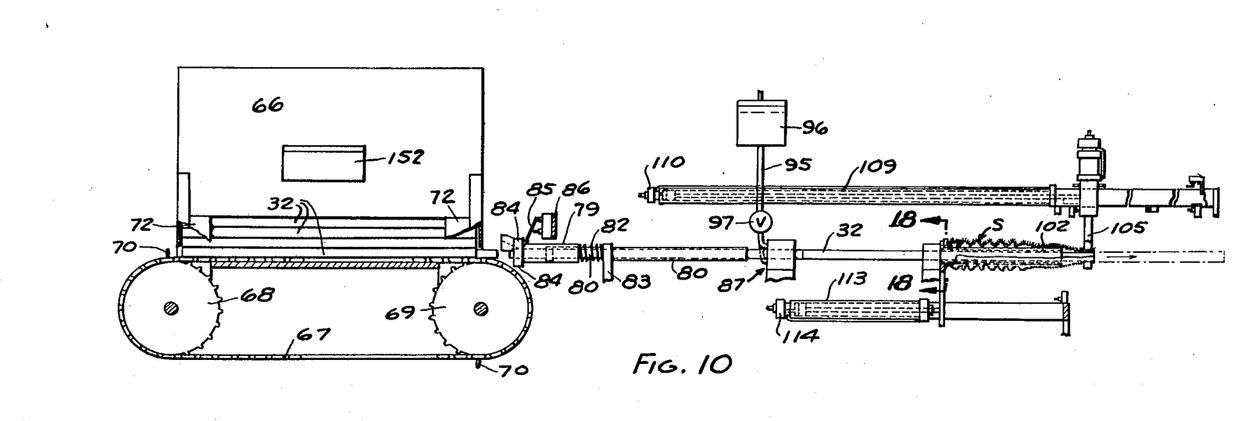
FIG. 10 is a part sectional elevational view of the apparatus for transferring the inverted sleeve onto a core.

The apparatus for transferring the sleeve, which has been inverted onto the tube 33, from the tube 33 to a paint roller core 32 is shown in FIG. 10. A hopper 66 is provided for feeding cores 32 to an endless conveyor 67 in the form of a chain trained over sprockets 68 and 69. The chain 67 is provided with outwardly projecting tabs 70 which are adapted to contact a core 32 and strip it from the lower part of the hopper 66. In order to facilitate feeding of the cores, the hopper 66 is mounted on springs 151 and a vibrator 152 is mounted on a hopper to continuously vibrate the hopper.

Figure 11:
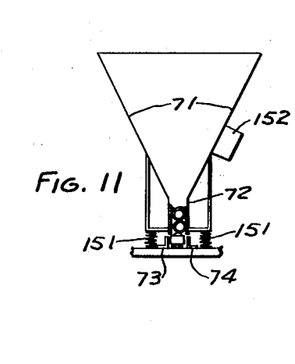
FIG. 11 is a part sectional end view of the apparatus for feeding cores successively.
Figure 12:
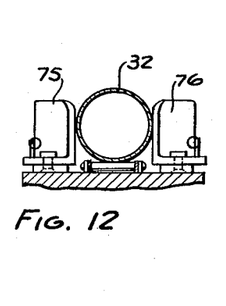
FIG. 12 is a fragmentary sectional view taken along the line 12—12 in FIG. 14.
Figure 13:
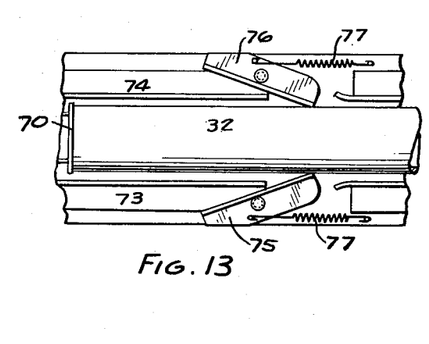
FIG. 13 is a fragmentary plan view of the portion of the apparatus for guiding the cores.
Figure 14:
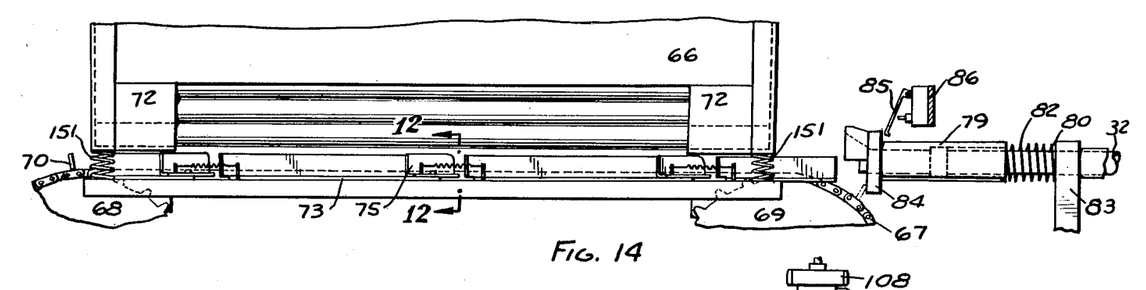
FIG. 14 is a sectional elevational view of a portion of the apparatus shown in FIG. 10 on an enlarged scale.

As shown in FIG. 11, the hopper 66 has the sides 71 thereof tapered downwardly so that the cores 32 therein are caused by gravity to be fed one by one onto the conveyor 67. The lower portion of the hopper includes spaced vertical sides 72 at either end of the hopper for guiding the cores 32 singly onto the conveyor. As shown in FIG. 13, side rails 73, 74 are positioned to guide each core 32 as it is stripped and moved along by the tabs 70 of the conveyor 67. The distance between the rails 73, 74 is sufficient to provide clearance for the tabs 70 which are preferably of greater width than the diameter of the cores 32. In order to maintain the core 32 centrally of the rails 73, 74, small arms 75, 76 are pivotally connected adjacent and at spaced points along the length of the rails 73, 74, respectively, and have their ends thereof extending inwardly into the paths of the cores 32. Springs 77 act on the arms 75, 76 and tend to keep the ends thereof in inwardly extending position (FIGS. 12, 13 and 14).

As each core is stripped from the hopper, it is caused to pass through a tube 80 and an elongated collar 79 which is telescopically mounted on tube 80. The collar is maintained in outwardly extending position at one end of tube 80 by a spring 82 positioned between the collar 79 and a fixed support 83 on which tube 80 is mounted. As the core 32 passes through the collar 79, the tab 70 on the chain 67 contacts a flange 84 on the collar 79 and moves the collar along the path of movement of the core 32 against the action of the spring 82. The movement of the collar 79 causes the collar to engage an arm 85 of switch 86, which controls the operation of the apparatus for transferring the sleeve to the core, as presently described. After the tab 70 clears the collar, the spring 82 returns the collar to its original position.

Each core is moved through the apparatus by a successive core being stripped from the hopper 66 and is guided through the tube 80 to an adhesive applying station 87 where a layer of adhesive is applied to the outer surface of the core.

Figure 16:
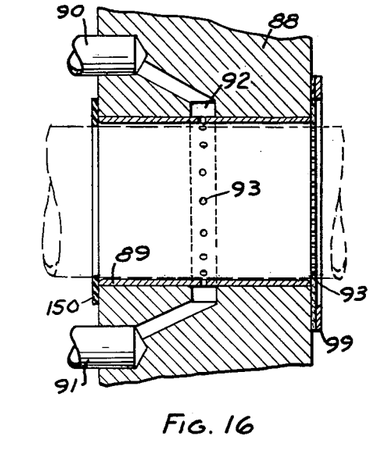
FIG. 16 is a sectional view taken along the line 16—16 in FIG. 17.
Figure 17:
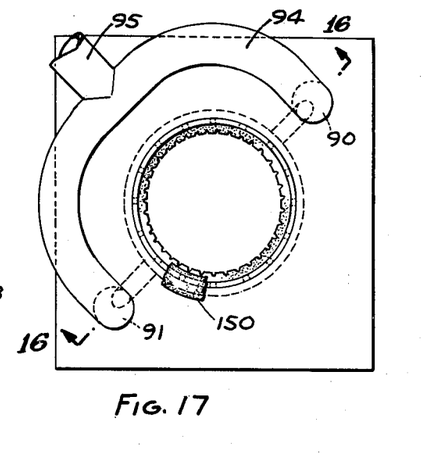
FIG. 17 is an end view of the apparatus for applying a coating of adhesive to the cores.
Figures 18, 19:
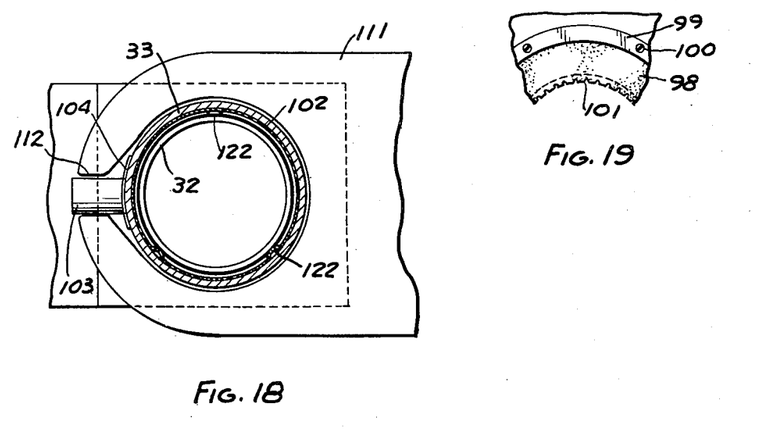
FIG. 18 is a sectional view taken along the line 18—18 in FIG. 10.
FIG. 19 is a fragmentary end view of the apparatus shown in FIG. 16.

Referring to FIGS. 16, 17 and 19, the adhesive-applying apparatus includes a head 88 which is provided with an opening 89 therethrough having substantially the same diameter as the external diameter of the cores 32 which are passed therethrough. The head 88 is provided with channels 90, 91 communicating with an annular channel 92 which, in turn, is connected to the interior surface of the opening 89 by a multiplicity of circumferentially spaced radial holes 93. The channels 90, 91 are connected together by a single pipe 94 which, in turn, is connected by a pipe 95 to a source 96 of adhesive under pressure. A valve 97 may be positioned in the pipe 95 to control the flow of adhesive to the head 88. The flow of adhesive may also be by gravity.

As the core 32 is passed through the head 88, adhesive is applied to the outer surface thereof through the holes 93. In order to distribute the adhesive on the outer surface of the core, an annular ring 98 of flexible material such as neoprene is provided at the outlet of the opening 89. The ring is held in proper relation to the opening by means of a metal ring 99 held in position by screws 100. The flexible ring 98 is of slightly less diameter than the outer diameter of the core 32 and is provided with a multiplicity of serrations 101, whereby when the core 32 passes through the flexible ring, the adhesive is equally distributed over the outer surface of the core, but the adhesive is not completely removed therefrom. The flow of adhesive rearwardly of the head 88 is prevented by an annular gasket 150 at the inlet of the opening 89. (Not shown in FIG. 17.)

Figure 15:
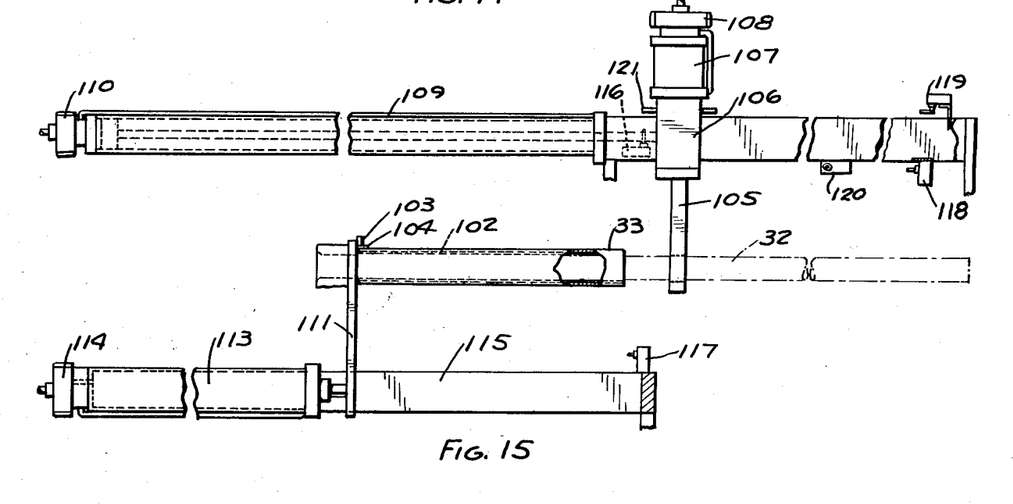
FIG. 15 is an elevational view on an enlarged scale of the transferring portion of the apparatus shown in FIG. 10.
Figure 22:
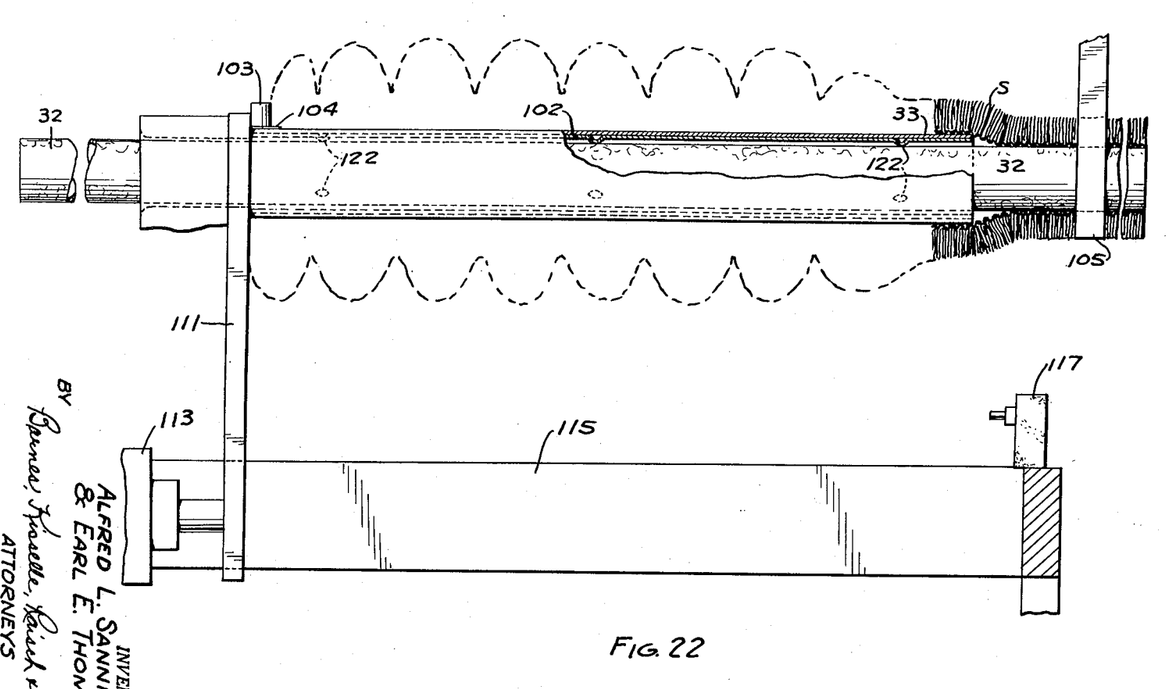
FIG. 22 is a fragmentary part sectional view on an enlarged scale of the apparatus shown in FIG. 15.

Referring again to FIG. 10, as the core 32 having a layer of adhesive on the outer surface thereof is pushed further along, it passes through a hollow mandrel 102 positioned in the path of the core. The interior surface of the hollow mandrel 102 is formed with inwardly directed projections 122 which keep the adhesive coated core 32 from coming into face-to-face contact with the surfaces of the mandrel 102 (FIGS. 18, 22). The projections are preferably in the form of small dimples or indentations which are spaced circumferentially and longitudinally of the mandrel. For example, three projections 122 are preferred circumferentially. In a mandrel which is eighteen inches in length, the projections 122 are preferably spaced longitudinally approximately six inches apart and inwardly from the ends of the mandrel. The transfer tube 33 onto which the sleeve has been previously inverted is positioned over the hollow mandrel 102 and is held in position thereon by a radial projection 103 on tube 33 which engages with a hook 104 on the mandrel 102, as shown in FIG. 15.

As further shown in FIG. 10, the end of the sleeve on the tube 33 is first pulled manually off the tube, bringing it into position for contact with the end of the core 32 as the core moves through the hollow mandrel 102. When the end of the core and the end of the sleeve are aligned, a pair of jaws 105 is caused to grip the sleeve and the core; and the jaws are then moved in a path parallel with the axis of the hollow mandrel 102, thereby pulling the sleeve and core and transferring the sleeve from the tube 33 to the core 32.

The jaws 105 are mounted in a housing 106 of the same construction as that used in the apparatus for inverting the sleeve (FIGS. 8, 9). The opening and closing of the jaws 105 is provided by a pneumatic motor 107 which, in turn, is controlled by a solenoid operated valve 108, as shown in FIG. 15. The jaws are moved in a path parallel to the axis of the hollow mandrel 102 by a pneumatic motor 109 which, in turn, is controlled by a solenoid actuated valve 110.

In order to facilitate the transfer of the sleeve from the transfer tube 33 to the core 32, a pusher bar 111 may be provided for pushing the end of the sleeve off the tube 33. As shown in FIGS. 15 and 18, the end of the pusher bar 111 encircles the tube 33 and is provided with a slot 112 to permit clearance with the radial projection 103 of the tube 33. Near the end of the stroke of the jaws 105, the pusher bar 111 is caused to be moved in a path parallel to the axis of the hollow mandrel 102. The movement of the pusher bar is controlled by a pneumatic motor 113 which, in turn, is controlled by a solenoid operated valve 114. The movement of the pusher bar is guided by guide bars 115.

As shown in FIGS. 14 and 15, the operation of the apparatus for transferring the sleeve from the tube 33 to the core 32 is controlled by switch 86 which is positioned near the hopper 66, switches 116, 117 mounted in fixed position at one end of the path of movement of the jaws 105 and pusher bar 111, respectively, and switches 118, 119 mounted in fixed position at the other end of movement of the path for movement of the jaws 105.

As a core 32 is pushed through the hollow mandrel 102 by another core, the tabs 70 pushing the second core will contact the flange 84 of collar 79 and cause the collar 79 to move, closing the switch 86. At this instant, a core 32, passing through the mandrel 102, will be in position with the end of the core in register with the end of the sleeve which has been pulled off of the tube 33. Closing of the switch 86 will cause the solenoid operated valve 108 to be actuated, operating the pneumatic cylinder 107 to close the jaws 105 around the sleeve and core 32. The closing of the jaws 105 will, in turn, cause lever 121, mounted on the plunger of motor 107 to contact switch 116. This will actuate solenoid operated valve 110, causing the pneumatic motor 109 to move the jaws 105 in a path parallel to the axis of the hollow mandrel 102.

As the jaws 105 move along their path and cause the sleeve to be transferred from the transfer tube 33 to the core 32, the housing 106 of the jaws contacts a switch 120 which actuates the solenoid operated valve 114 causing the pneumatic motor 113 to move the pusher bar 111 and thereby push the end of the sleeve off the tube 33, thereby assisting the transfer of the sleeve onto the core. As the jaws 105 reach the end of their stroke, the housing 106 of the jaws contacts switch 118 which causes the solenoid operated valve 108 to again be actuated, opening the jaws 105. As the jaws 105 are opened, the lever 121 contacts switch 119 which actuates solenoid operated valve 110 to return jaws 105 to their original position. As the pusher bar 111 reaches the end of its movement, it contacts switch 117 which energizes solenoid operated valve 114 to return the pusher bar to its original position.

The pneumatic motors which are used in the sleeve inverting apparatus and the sleeve transferring apparatus are of the double-acting type and the solenoid operated valves which actuate the pneumatic motors are all of the same type such as described in conjunction with valve 53.

Figure 20:
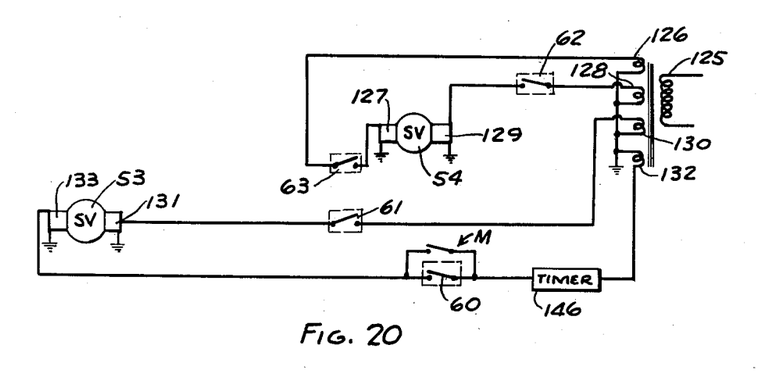
FIG. 20 is a diagrammatic wiring diagram of the circuit for controlling the operation of the apparatus for inverting the sleeve.

A diagrammatic wiring diagram for the apparatus for inverting the sleeve is shown in FIG. 20. The circuit comprises a primary 125 and a multiplicity of secondary coils. The solenoid operated valve 54 for controlling the motor 38 which controls the movement of the jaws in a path parallel to the tube 33 has one of the solenoid coils 127 thereof connected in a circuit including secondary 126 and switch 63. The other solenoid 129 of the valve 54 is connected in a circuit including secondary 128 and switch 62. The solenoid operated valve 53 which controls the opening and closing of the jaws has one solenoid coil 131 thereof connected in a circuit with secondary 130 and switch 61. The other solenoid 133 of the valve 53 is connected in a circuit including secondary 132, timer 146 and switch 60.

A main switch M is provided in parallel with switch 60. After the cylinder 57 (FIG. 7) has been operated to position a knitted tubular sleeve within the hollow mandrel 35 and the tube 33, and the end of the tubular sleeve has been turned over manually onto the tube 33, the switch M is temporarily depressed causing the solenoid 133 to be momentarily energized actuating the valve 53 to cause the motor 50 to close the jaws.

Closing of the jaws momentarily closes switch 63 which momentarily energizes solenoid 127 of valve 54 causing the motor 38 to move the jaws in a path parallel to the longitudinal axis of the tube 33. As the jaws reach the end of their movement, the switch 61 is closed momentarily energizing solenoid 131 to actuate the valve 53 causing motor 50 to open the jaws. The opening of the jaws momentarily closes switch 62, energizing solenoid 129 and actuating the valve 54 to cause the motor 38 to return to its original position. As the jaws return to their original position, the switch 60 is closed again causing the jaws to be closed and the cycle is repeated.

The timer 146 provided in the circuit of the switch 60 may be adjusted to permit a limited number of energizations of the circuit which includes the switch 60 as required by the length of the sleeve. For example, in the case of a forty-eight inch sleeve where the jaws move eight inches, the inverting would be accomplished by six reciprocations of the jaws; and after the circuit containing the switch 60 has been energized six times, the timer will prevent the circuit from being reenergized until the switch M has been again depressed when a new sleeve is in position for inverting.

Figure 21:
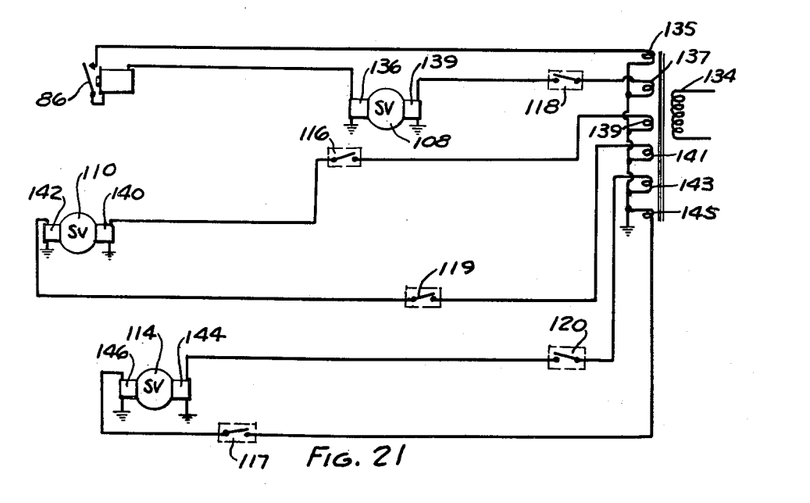
FIG. 21 is a diagrammatic wiring diagram of the circuit for controlling the apparatus for transferring the inverted sleeve to the core.

A diagrammatic wiring diagram for the apparatus for transferring the sleeve to a core is shown in FIG. 21. The circuit includes a primary 134 and a multiplicity of secondary coils. The solenoid operated valve 108 which controls the opening and closing of the jaws 105 has one solenoid 136 thereof connected in a circuit with a secondary coil 135 and switch 86. The other solenoid 139 of the valve 108 is connected with a secondary coil 137 and switch 118. The solenoid operated valve 110 which controls the movement of the jaws in a path parallel to the longitudinal axis of the tube 33 has one solenoid 140 thereof connected in a circuit with a secondary coil 139 and switch 116. The other solenoid 142 of the valve 110 is connected in a circuit including a secondary coil 141 and switch 119. The solenoid operated valve 114 which controls the movement of the pusher bar 111 has one solenoid 144 thereof connected in a circuit including a secondary coil 143 and switch 120. The other solenoid 146 of the valve 114 is connected in a circuit including a secondary coil 145 and switch 117.

As a core 32 is fed by the endless belt 67, the tab 70 on the endless belt causes the collar 79 to momentarily close switch 86. This momentarily energizes solenoid 136 actuating the valve 108 to cause the motor 107 to close the jaws 105. Closing of the jaws momentarily closes the switch 116 which, in turn, momentarily energizes solenoid 140 actuating the valve 110 causing the motor 109 to move the jaws in a path parallel to the longitudinal axis of the tube 33.

As the jaws move along their path and approach the end of their path, the switch 120 is momentarily closed energizing solenoid 144 of the valve 114 causing the motor 113 to move the pusher bar 111 along the hollow mandrel 102. As the jaws arrive at the end of their path, switch 118 is momentarily closed, momentarily energizing solenoid 139 actuating the valve 108 in the opposite direction to open the jaws.

Opening of the jaws causes the switch 119 to be momentarily closed momentarily energizing solenoid 142 to actuate the valve 110 in the opposite direction and return the jaws to their original position. Substantially simultaneously with the arrival of the jaws 105 to the end of their path, the pusher bar 111 arrives at the end of its path and contacts the switch 117 momentarily energizing solenoid 146 and actuating the valve 114 to return the pusher bar to its original position. The parts are then in position for repeating the cycle when the switch 86 is closed by a core being fed to the apparatus.

The operation of the various mechanisms may be summarized as follows: A tube 33 is first mounted on tubular mandrel 35 and a sleeve S is positioned within the tubular mandrel 35 by the operation of the motor 57. The end of the sleeve S is thereafter turned over onto the tube 33 and the jaws 34 are caused to grip and move the sleeve along the length of the tube 33 in successive gripping and reciprocating movements to pull and invert the sleeve S onto the tube 33. The tube 33 with the sleeve inverted thereon is then slipped over mandrel 102 and a portion of the sleeve is pulled off the tube. As each core 32 is stirpped from the hopper 66, it pushes the previously stripped core 32 through the adhesive applying head 88 and thereafter through the hollow mandrel 102. The projections 122 maintain the core 32 in spaced relationship to the hollow mandrel and prevent the adhesive from being wiped off the core. As a core is moved through mandrel 102 and adhesive is displaced on the surface thereof by the projections 122, the adhesive redistributes itself after passing the projections to provide an even layer of adhesive on the core, due to the fluidity of the adhesive. As the forward end of the core 32 passes through the hollow mandrel 102, the jaws 105 are caused to grip the end of the sleeve and the end of the core and move the sleeve and core, transferring the sleeve from the tube to the core. As the sleeve and core are moved along, the pusher bar 111 pushes the end of the sleeve off the tube 33.

The adhesive not only adheres the sleeve to the core but, in addition, seals the back of the base fabric to lock the pile fibers in the base fabric and prevent them from being pulled out of the sleeve. The adhesive which is used is preferably of the thermosetting type and must not only provide an effective seal between the material of the base fabric and the core, but in addition, must be chemically resistant to paints and varnishes in which the paint roller is to be used. The adhesive must be applied in such amounts and at such fluidity that the base fabric is sufficiently impregnated to lock the pile fibers therein.

It can thus be seen that we have provided an apparatus for inverting and transferring the knitted sleeves onto the cores. The apparatus is particularly suited to the handling of a tubular knitted sleeve which is knitted with the fibers of the pile formed on the interior of the sleeves and wherein the sleeve is relatively elastic and the fibers of the pile are quite long and intermingled so that substantially the entire interior of the sleeve prior to inverting is filled with fibers. The apparatus is also particularly suited to a tubular knitted sleeve wherein the pile fibers are not held within the base fabric in any other manner than by the knitting.

This application is a division of our co-pending application Serial No. 541,702, filed October 20, 1955, entitled "Manufacture of Paint Rollers and the Like," now Patent No. 2,944,588.

We claim:

1. In an apparatus for manufacturing paint rollers from a knitted pile fabric sleeve wherein the sleeve is mounted on a tubular member with the pile extending outwardly, the combination which comprises means for supporting said tubular member with the interior of said tubular member unobstructed, means for moving a core onto which the sleeve is to be transferred through said tubular member, and means for clamping one end of said sleeve on one end of said core as it passes through the tubular member and moving said sleeve and said core relative to said tubular member in a path parallel to the longitudinal axis of said tubular member thereby transferring said sleeve from said tubular member onto said core.

2. The apparatus set forth in claim 1 wherein said means for supporting said tubular member comprises a hollow tubular mandrel over which the tubular member is telescopically positioned.

3. The apparatus set forth in claim 1 including means for applying a force to the other end of said sleeve to facilitate its removal from the tubular member.

4. In an apparatus for manufacturing paint rollers from a knitted pile fabric sleeve wherein the sleeve is mounted on a tubular member with the pile extending outwardly, the combination which comprises means for supporting said tubular member with the interior of said tubular member unobstructed, means for moving a core onto which the sleeve is to be transferred through said tubular member, and means for gripping one end of said sleeve and one end of said core as it passes through the tubular member and moving said sleeve and said core in a path parallel to the longitudinal axis of said tubular member thereby transferring said sleeve from said tubular member onto said core, said means for gripping and moving said sleeve and core comprising a pair of jaws, means for controlling the opening and closing of said jaws, and means for moving said jaws in a path parallel to the longitudinal axis of said tubular member.

5. The apparatus set forth in claim 4 including means actuated by the opening and closing of said jaws for controlling said means for moving said jaws in a path parallel to the longitudinal axis of said tubular member.

6. The apparatus set forth in claim 4 wherein said means for opening and closing said jaws comprises a fluid motor.

7. The apparatus set forth in claim 5 wherein said means for moving said jaws in a path parallel to the longitudinal axis of said tubular member comprises a fluid motor operatively connected to said jaws.

8. The apparatus set forth in claim 7 wherein said means actuated by the opening and closing of said jaws for controlling said fluid motor comprises a solenoid operated valve, a switch adapted to be actuated in response to closing of said jaws and a second switch adapted to be actuated in response to opening of said jaws, said switches being operatively connected with said solenoid operated valve.

9. In an apparatus for manufacturing paint rollers from a knitted pile fabric sleeve wherein the sleeve is mounted on a tubular member with the pile extending outwardly, the combination which comprises means for moving cores on which the sleeves are to be mounted past an adhesive applying station and a sleeve transferring station, means positioned at said adhesive applying station for applying a layer of adhesive to the outer surface of each said core, and means positioned at said sleeve mounting station for transferring a sleeve from the tubular member on which said sleeve has been inverted onto a core.

10. The apparatus set forth in claim 9 wherein said means for applying a layer of adhesive to the outer surface of said core comprises a body having an opening therethrough through which said core passes, a multiplicity of holes positioned circumferentially of said opening, means forming a part of said body for supplying adhesive to said holes, and means associated with said body for distributing said adhesive which is applied to said core through said holes onto the outer surface of said core.

11. The apparatus set forth in claim 10 wherein said means for distributing said adhesive comprises an annular ring of resilient material mounted on said body and surrounding said opening in said body, the inner diameter of said ring being slightly less than the opening in said body, said ring being formed with a series of corrugations in the area along the inner periphery thereof.

12. The apparatus set forth in claim 9 wherein said means for transferring said sleeve comprises a hollow mandrel positioned in the path of said cores and through which the cores are arranged to move, and means for gripping and moving said sleeve and the end of said core as it moves through said hollow mandrel and thereby transferring the sleeve from said tubular member to said core.

13. The apparatus set forth in claim 12 including means actuated by the movement of said cores for controlling said means for gripping and moving said sleeve and core.

14. In an apparatus for manufacturing paint rollers from a knitted pile fabric sleeve wherein the sleeve is mounted on a tubular member with the pile extending outwardly, the combination which comprises means for moving cores on which said sleeves are to be mounted in succession with the axes of said cores parallel to the axis of movement of said cores, means for mounting a tubular member on which a sleeve has been inverted in the path of said cores so that the cores move through the tubular member, and means for gripping the end of said sleeve and the end of said core as it moves through said tubular member and moving said sleeve and cores in a path parallel to the longitudinal axis of said tubular member thereby transferring said sleeve from said tubular member onto said core.

15. The apparatus set forth in claim 14 including means positioned in the path of said cores and actuated thereby to control said means for gripping and moving said sleeve and core.

16. The apparatus set forth in claim 15 wherein said means positioned in the path of said cores includes a switch adapted to be actuated by the passage of said cores.

17. The apparatus set forth in claim 14 wherein said means for moving said cores in succession comprises a hopper so constructed and arranged to supply said cores in succession by gravity, an endless belt positioned below said hopper and having means mounted thereon for engaging and stripping a core from the bottom of said hopper.

18. The apparatus set forth in claim 17 including means actuated by the movement of said endless belt for controlling said means for gripping and moving said sleeve and core.

19. In an apparatus for manufacturing paint rollers from a knitted pile fabric sleeve wherein the sleeve is mounted on a tubular member with the pile extending outwardly, the combination which comprises means for moving cores, onto which the sleeves are to be mounted, in succession in a path wherein the longitudinal axes of the cores are parallel to the path of movement, means for mounting an inverted knitted pile fabric sleeve in the path of said cores, jaws mounted adjacent the path of said cores for gripping the end of a sleeve and the end of a core, means for opening and closing said jaws, means for moving said jaws in a path parallel to the longitudinal axis of said cores thereby transferring said sleeve to said cores, means positioned in the path of said cores adapted to control said means for opening and closing said jaws, means actuated by the closing of said jaws for controlling said means for moving said jaws to cause movement of said jaws in one direction, means actuated by the movement of said jaws to control said means for opening and closing of said jaws and cause opening of said jaws, means actuated by the opening of said jaws to control said means for moving said jaws to cause said means to move the jaws in the opposite direction to their original position.

20. The apparatus set forth in claim 19 wherein said means actuated by the opening and closing of said jaws comprises a switch adapted to be actuated in response to closing of said jaws and a second switch adapted to be contacted by the opening of said jaws.

21. In an apparatus for manufacturing paint rollers from a pile fabric sleeve wherein the sleeve is mounted on a tubular member with the pile extending outwardly, the combination which comprises a hollow tubular mandrel for supporting said tubular member, said tubular member being telescoped over said hollow mandrel, means for moving a core onto which the sleeve is to be transferred through said hollow mandrel, and means within said mandrel projecting inwardly from said hollow mandrel for supporting said core in spaced relationship to the inner wall of said hollow mandrel, whereby adhesive previously applied to the outer surface of said core is substantially undisturbed in the passage of the core through the hollow mandrel.

22. In an apparatus for manufacturing paint rollers from a pile fabric sleeve, the combination which comprises a hollow tubular mandrel for supporting said sleeve, said sleeve being telescoped over said mandrel, and means within said mandrel projecting inwardly from said hollow mandrel for supporting a core in spaced relation to the inner wall of said hollow mandrel whereby said core may be passed through said hollow mandrel for the transfer of said sleeve to said core without substantially disturbing the adhesive previously applied to the outer surface of said core.

23. In the manufacture of paint rollers from a pile fabric sleeve, the combination which comprises a hollow tubular mandrel for supporting a pile fabric sleeve on the outer surface thereof with the pile extending outwardly, means for moving a core onto which the sleeve is to be transferred through said hollow mandrel, and means within said mandrel projecting inwardly from said hollow mandrel for supporting said core in spaced relationship to the inner wall of said hollow mandrel, whereby adhesive previously applied to the outer surface of said core is substantially undisturbed in the passage of the core through the hollow mandrel.

24. The combination set forth in claim 23 wherein said means projecting inwardly from said hollow mandrel comprise circumferentially and longitudinally spaced projections on the inner surface of said hollow mandrel.

25. The combination set forth in claim 23 wherein said means projecting inwardly from said hollow mandrel comprise circumferentially and longitudinally spaced indentations on the inner surface of said hollow mandrel.

26. In an apparatus for manufacturing paint rollers from a pile fabric sleeve, the combination which comprise a hollow tubular mandrel for supporting a pile fabric sleeve with the pile extending outwardly, means for moving a core onto which the sleeve is to be transferred through said hollow mandrel, means positioned in the path of said core prior to movement of said core to said hollow mandrel for applying a layer of adhesive to said core as it moves toward said hollow mandrel, and means projecting inwardly from said hollow mandrel for supporting said core in spaced relationship to the inner wall of said hollow mandrel.

27. In an apparatus for manufacturing paint rollers from a pile fabric sleeve, the combination which comprises a hollow tubular mandrel for supporting a pile fabric sleeve on the outer surface thereof with the pile extending outwardly, means within said mandrel projecting inwardly from said hollow mandrel for supporting a core in spaced relationship to the inner wall of said hollow mandrel, and means for clamping the end of said core on said mandrel and pulling said core through said hollow mandrel, whereby said core may be passed through said hollow mandrel for the transfer of said sleeve to said core without substantially disturbing the adhesive previously applied to the outer surface of said core.

28. In the manufacture of paint rollers from a pile fabric sleeve, the combination which comprises means for moving cores in succession past an adhesive applying station and a sleeve transferring station, means positioned at said adhesive applying station for applying a layer of adhesive to the outer surface of each said core, a tubular mandrel positioned at said sleeve transferring station in the path of said cores and through which the cores are arranged to move, said tubular mandrel being adapted to support the pile fabric sleeve with the pile extending outwardly, means projecting inwardly of said tubular mandrel for supporting a core positioned within said mandrel in spaced relationship to the inner surfaces of said mandrel, and means at said sleeve transferring station for gripping and moving said sleeve and the end of said core as it moves through said tubular mandrel, and thereby transferring the sleeve from said tubular mandrel through said core without substantially disturbing the adhesive previously applied to the outer surface of said core.

29. In an apparatus for manufacturing paint rollers from a knitted pile fabric sleeve wherein the sleeve is mounted on a tubular member with the pile extending outwardly, the combination which comprises means for supporting said tubular member with the interior of said tubular member unobstructed, and means for clamping one end of said sleeve on a core positioned within said tubular member with a portion thereof projecting beyond said tubular member and moving said sleeve and said core relative to said tubular member in a path parallel to the longitudinal axis of said tubular member thereby transferring said sleeve from said tubular member onto said core.

References Cited in the file of this patent

UNITED STATES PATENTS

| | | |
|---|---|---|
| 2,038,840 | Hall | Apr. 28, 1936 |
| 2,344,264 | Perrault | Mar. 14, 1944 |
| 2,493,153 | Martin | Jan. 3, 1950 |
| 2,506,079 | Grant | May 2, 1950 |
| 2,522,495 | Ballagh | Sept. 19, 1950 |
| 2,583,819 | Cummings | Jan. 29, 1952 |
| 2,608,501 | Kimble | Aug. 26, 1952 |